United States Patent [19]                [11] Patent Number:     4,511,294
Grunsky et al.                                  [45] Date of Patent:   Apr. 16, 1985

[54] ROTARY MATERIAL REMOVING TOOL

[75] Inventors: Manfred Grunsky, Dreieichenhain; Reiner Süssmuth, Neu Isenburg; Günter Ischen, Oberhausen, all of Fed. Rep. of Germany

[73] Assignee: Stellram GmbH, Heusenstamm, Fed. Rep. of Germany

[21] Appl. No.: 398,639

[22] Filed: Jul. 15, 1982

[30] Foreign Application Priority Data

Feb. 8, 1982 [DE] Fed. Rep. of Germany ....... 3204245

[51] Int. Cl.³ ............................................... B23B 51/00
[52] U.S. Cl. .................................... 408/232; 408/231; 408/233; 408/713
[58] Field of Search ................... 408/57, 59, 186, 197, 408/198, 227, 231, 713, 181, 185, 226, 233, 239 R, 239 A; 175/412, 413; 403/362, 409, 161, 361; 407/104

[56] References Cited

U.S. PATENT DOCUMENTS

| 1,062,486 | 5/1913 | Lord | 403/362 |
| 2,369,875 | 2/1945 | Wanelik | 408/181 |
| 2,867,140 | 1/1959 | Getts | 408/57 |
| 2,990,189 | 6/1961 | Beers | 403/361 X |
| 3,064,503 | 11/1962 | Fry | 408/232 |
| 3,138,846 | 6/1964 | Conti et al. | 407/104 |
| 3,364,800 | 1/1968 | Benjamin et al. | 408/59 X |
| 3,667,768 | 6/1972 | Stokey | 279/86 X |
| 3,747,179 | 7/1973 | Lovedahl | 407/104 |
| 4,116,579 | 9/1978 | Hamilton | 408/239 A |

FOREIGN PATENT DOCUMENTS 897040  7/1949  Fed. Rep. of Germany ...... 408/110
178605 11/1982 Japan ................................. 408/199

Primary Examiner—William R. Briggs
Attorney, Agent, or Firm—Peter K. Kontler

[57] ABSTRACT

A material removing tool includes an elongated shank having a rear end portion arranged to be driven by the motor of a boring or milling machine and a front end portion provided with a coaxial stub which is received in a socket between two legs of an adapter which carries the cutting implement. At least one of the legs has a radial hole which is in near register with a tapped bore of the stub. The shank portion of a screw, whose head bears against a conical surface surrounding a portion of the hole in the one leg, meshes with the threads in the tapped bore of the stub to urge the rear edge faces of the legs against complementary surfaces provided on two shoulders forming part of the front end portion of the shank. This enhances the resistance to bending stresses and prevents wobbling or vibration of the adapter relative to the shank. The external surfaces of the adapter and shank are formed with longitudinally extending grooves for evacuation of shavings or chips from the locus of removal of material from a workpiece. The diameter of the hole exceeds the diameter of the tapped bore, and the axis of the tapped bore is nearer to the shoulders of the shank than the axis of the hole. The head of the screw has a conical peripheral surface whose inclination is the same as that of the conical surface bounding the above-mentioned portion of the hole in the one leg. A second screw can be provided to secure the other leg of the adapter to the stub. The socket of the adapter and the stub can be stepped to further enhance the resistance to bending stresses.

18 Claims, 6 Drawing Figures

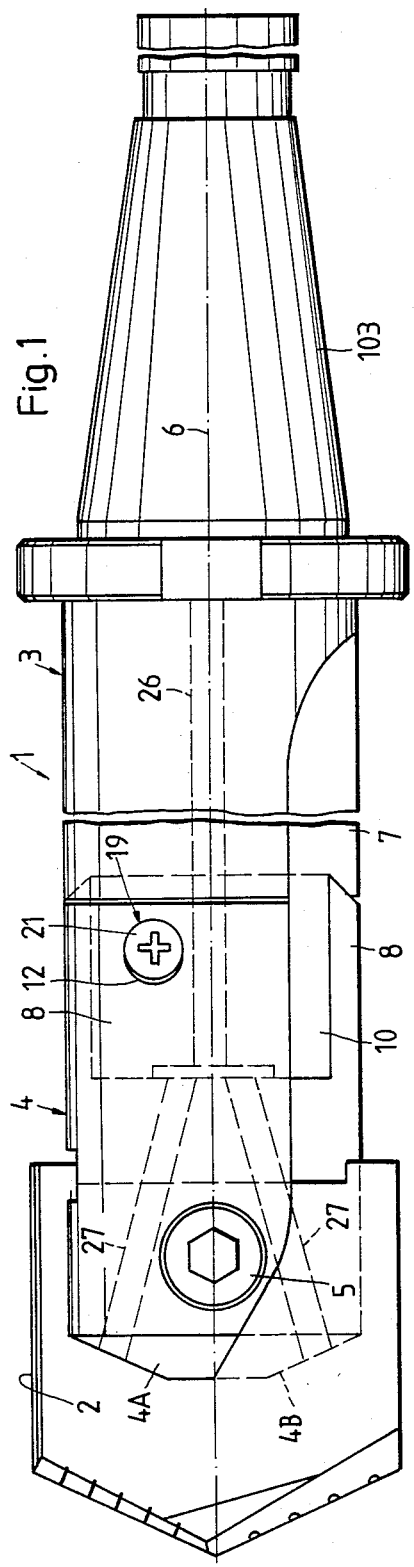
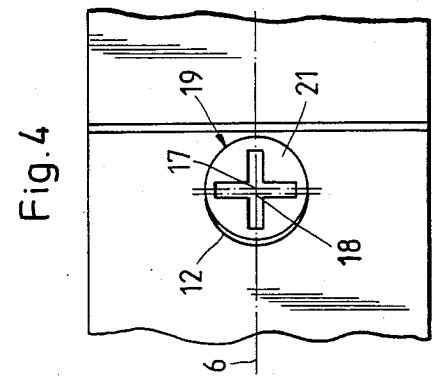
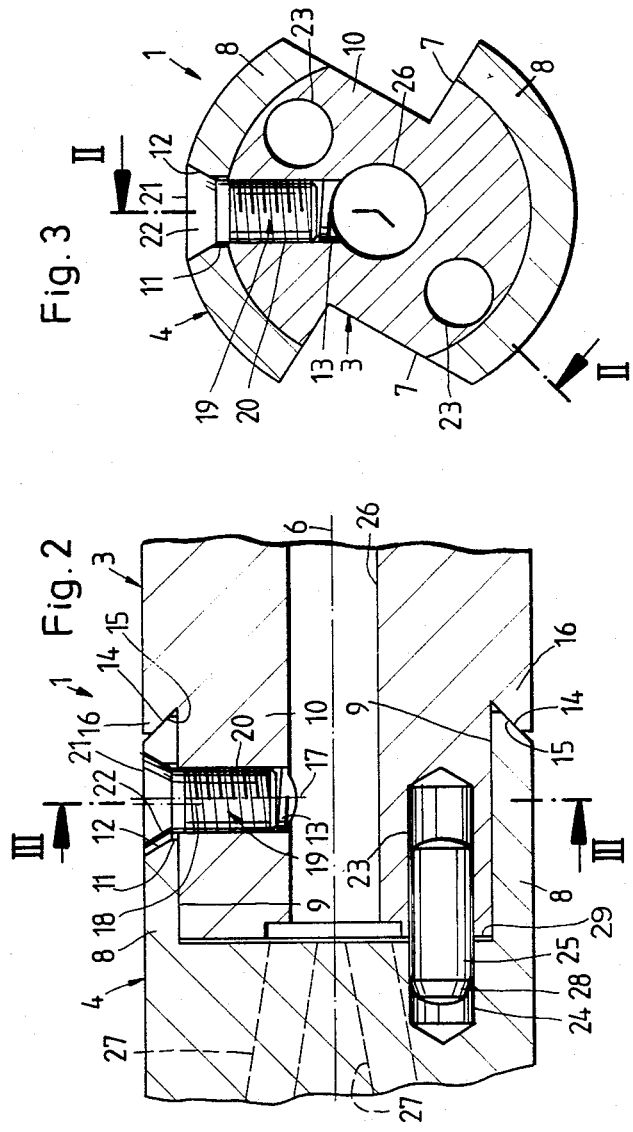

ROTARY MATERIAL REMOVING TOOL

BACKGROUND OF THE INVENTION

The present invention relates to material removing tools, such as boring or milling tools, and more particularly to improvements in rotary supports or holders for the knives, cutters or analogous material removing implements of such tools.

It is already known to interpose an adapter between a material removing knife or cutter and a rotary shank which is insertable into the chuck of a boring, drilling or an analogous machine so that it can transmit torque to the knife or cutter through the medium of the adapter. The adapter is connected to the front end face of the shank by at least one screw so that it can be readily separated from the shank but is capable of transmitting torque to the knife or cutter which is carried thereby and is held in axial alignment with the shank. The adapter and the shank are formed with aligned chip-removing grooves. It is also known to provide the front end of the shank with a forwardly extending projection or stub which extends into a complementary socket of the adapter. The aforementioned screw which connects the adapter to the shank extends through aligned radially extending bores provided in that portion of the adapter which surrounds the socket and in the stub of the shank.

In a conventional tool holder of the above-outlined character, the front end face of the shank is formed with two eccentric plugs which extend into complementary axially parallel bores in the rear end face of the adapter. The adapter is formed with additional bores which extend radially of the just mentioned axially parallel bores and receive screws serving to secure the adapter to the respective plugs at the front end of the shank. The remainder of the front end face of the shank is disposed in a radial plane and is smooth. Such mode of connecting the shank with the adapter is not entirely satisfactory because the adapter is likely to vibrate when the tool is in actual use. Moreover, the connection which consists exclusively of two eccentric plugs is not sufficiently resistant to bending stresses which arise when the cutting edge or edges of the knife or knives penetrate into the material of a workpiece.

OBJECTS AND SUMMARY OF THE INVENTION

An object of the invention is to provide a holder or support for use in material removing tools which is constructed and assembled in such a way that the connection between its shank and its adapter is not likely to vibrate when the tool is in actual use.

Another object of the invention is to provide a holder or support which can stand pronounced bending stresses when the cutting edge or edges of the knife or knives penetrate into the material of a workpiece.

A further object of the invention is to provide a holder which can be used in conventional boring, reaming, drilling, milling or analogous machines as a superior and more versatile substitute for heretofore known holders.

Still another object of the invention is to provide a holder wherein the connection between the shank and the adapter is simple so that it can be terminated or established with little loss in time and with a high degree of reproducibility.

A further object of the invention is to provide a holder which can be used with a wide variety of material removing implements and which is capable of properly evacuating chips, shavings and/or other foreign matter from the region or regions of removal of material from a workpiece and which is further capable of properly cooling the cutting edge or cutting edges of the material removing implement or implements.

A further object of the invention is to provide a novel shank and a novel adapter which can be used in a holder of the above outlined character.

Still another object of the invention is to provide novel and improved means for preventing wobbling of the shank relative to the adapter and/or vice versa.

The invention is embodied in a material removing tool which comprises a rotary support including an adapter serving to support a knife, a cutter or an analogous material removing implement and including two spaced-apart legs defining a socket and having rear edge faces which are inclined with reference to the axis of the support. At least one of the legs has a hole which extends radially of the axis of the support. The latter further comprises a shank having a stub which extends into the socket and has a tapped bore extending substantially radially of the support. The shank is further formed with surfaces each of which is adjacent to one of the aforementioned edge faces. Still further, the support comprises means for releasably securing the adapter to the shank; such securing means comprises a screw having a threaded shank which meshes with the threads in the bore of the stub and a head which is received in the hole of the one leg. The axes of the hole in the one leg and of the bore in the stub are slightly offset relative to one another so that the head of the screw cooperates with the one leg to urge the edge faces of the legs against the adjacent surfaces of the shank. The shank comprises a torque-receiving portion which is coaxial with the stub and can receive torque from the motor of a drilling, boring, milling, reaming or an analogous machine.

The axis of the bore in the stub is nearer to the surfaces of the shank than the axis of the hole in the one leg, and the diameter of the hole in the one leg preferably exceeds the diameter of the bore in the stub. Furthermore, the head is preferably provided with a conical peripheral surface whose diameter increases in a direction away from the bore in the stub; in addition to or in lieu of such configuration of the head, the hole in the one leg can include a portion bounded by a conical surface which surrounds the head of the screw and whose diameter increases radially outwardly, i.e., in a direction away from the bore in the stub of the shank.

The aforementioned surfaces of the shank are preferably provided on two undercut shoulders of the shank, and such shoulders are preferably disposed diametrically opposite each other with reference to the axis of the support. The edge faces of the legs and the surfaces of the just mentioned shoulders preferably make acute angles with the axis of the support, and the surfaces of the shoulders are outwardly adjacent to the respective edge faces.

The likelihood of angular displacement of the adapter relative to the shank can be further reduced by providing the front end face of the stub with at least one axially parallel blind bore which registers with a blind bore in the adapter. The two blind bores receive a plug which is preferably a press-fit in one of the blind bores and has a conical or rounded end portion received in the other blind bore. The likelihood of angular displacement of the adapter relative to the shank and/or vice versa can be reduced still further if the securing means comprises a second screw which couples the other leg with the stub, preferably in the same way as described in connection with the screw which secures the stub with the one leg of the adapter.

The likelihood of flexing or bending in the region of connection between the adapter and the shank can be reduced still further by utilizing a stepped stub which extends into a stepped socket of the adapter. For example, the socket can have a smaller-diameter inner portion and a larger-diameter outer portion; the stub then comprises a smaller-diameter front portion which is received in the inner portion of the socket and a larger-diameter rear portion which is received in the outer portion of the socket.

The novel features which are considered as characteristic of the invention are set forth in particular in the appended claims. The improved holder itself, however, both as to its construction and the mode of assembling and/or adjusting the same, together with additional features and advantages thereof, will be best understood upon perusal of the following detailed description of certain specific embodiments with reference to the accompanying drawing.

BRIEF DESCRIPTION OF THE DRAWING

FIG. 1 is an elevational view of a holder or support which embodies one form of the invention and wherein the adapter carries a single material removing implement;

FIG. 2 is an enlarged fragmentary axial sectional view of the improved holder, substantially as seen in the direction of arrows from the line II—II in FIG. 3;

FIG. 3 is a transverse sectional view as seen in the direction of arrows from the line III—III in FIG. 2;

FIG. 4 is an enlarged view of a detail in the holder of FIG. 1;

DESCRIPTION OF THE PREFERRED EMBODIMENTS

Figure 5:
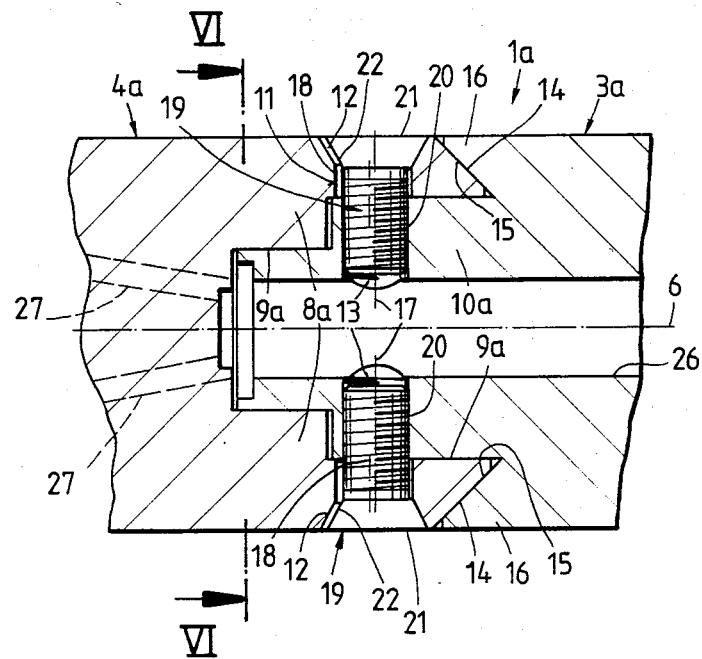
FIG. 5 is a fragmentary axial sectional view of a modified holder.

FIGS. 1 to 4 illustrate a first embodiment of a support or holder 1 which carries a material removing knife 2. The knife 2 constitutes a boring tool which can make or enlarge holes or bores in metallic or other workpieces. The holder or support 1 of FIGS. 1 to 4 comprises an elongated shank 3 having a conical rear end portion 103 which is insertable into the chuck or another rotary part of a boring or drilling machine, not shown. An adapter 4 is secured to the front end of the shank 3 and has a substantially diametrically extending slot for reception of the corresponding portion of the knife 2. The slot is flanked by two forwardly extending legs 4A, 4B of the adapter 4, and such legs are connected to each other by at least one clamping screw 5 whose axis is normal to the axis 6 of the shank 3 and which extends through a hole or bore in the rear portion of the knife 2. The shank 3 and the adapter 4 are formed with two chip removing grooves 7 (see particularly FIG. 3) which are disposed diametrically opposite each other with reference to the axis 6 of the shank 3 and serve for evacuation of material which is removed by the cutting edge or edges of the knife 2 when the improved tool is in actual use.

The rear end face of the adapter 4 is formed with a socket 9 which is flanked by two rearwardly extending legs 8 of the adapter 4. The legs 8 are disposed opposite each other with reference to the axis 6 of the shank 3 (see particularly FIG. 2 or 3) and flank a forwardly extending portion or stub 10 of the shank 3. The stub 10 is coaxial with and extends beyond the front end face of the major portion of the shank 3. One of the legs 8 has a radially extending bore 11 the outermost portion of which flares radially outwardly as shown at 12. The stub 10 is also formed with a radial bore 13 which is tapped and registers with the bore 11 of the one leg 8.

The rear surfaces or edge faces 14 of the legs 8 slope rearwardly and inwardly toward the axis 6 of the shank 3 and abut against similarly inclined edge faces or surfaces 15 provided on the forwardly extending ledges or shoulders 16 of the shank 3. When the surfaces or edge faces 14 abut against the neighboring surfaces 15, the rearmost portions of the legs 8 are wedged into the conical recesses which are defined by the portions or shoulders 16 of the shank 3.

The axis 17 of the bore 13 in the stub 10 is slightly offset with reference to the axis 18 of the bore 11 in the one leg 8 of the adapter 4. This can be readily seen in FIG. 2. The axes 17 and 18 will assume such positions when the edge faces 14 abut against the respective surfaces 15. The diameter of the bore 11 slightly exceeds the diameter of the bore 13. A screw 19 has a threaded shank 20 which extends through the bore 11 and meshes with the thread surrounding the bore 13. The head 21 of the screw 19 is received in the outwardly flaring portion 12 of the bore 11 in the one leg 8. The conicity of the peripheral surface 22 of the head 21 is the same as that of the surface surrounding the portion 12 of the bore 11. The diameter of the surface surrounding the portion 12 of the bore 11 exceeds that of the peripheral surface 22 of the head 21 on the screw 19.

The front end face 29 of the stub 10 has two axially parallel blind bores 23 which are disposed diametrically opposite each other with reference to the axis 6 of the shank 3 (see particularly FIG. 3). The blind bores 23 register with similar blind bores 24 which are machined into the surface at the bottom of the socket 9 between the legs 8 of the adapter 4. Each of the bores 23 receives the rear portion of a centering plug 25 which is a press-fit in the respective bore 23. The front end portions 28 of the plugs 25 are conical or rounded (see FIG. 2) so that they can be readily inserted into the corresponding bores 24 of the adapter 4. The plugs 25 not only center the adapter on the shank 3 but they also cooperate with the screw 19 to prevent angular displacements of the adapter 4 relative to the shank 3 or vice versa.

The shank 3 is formed with an axially extending coolant-conveying channel 26 the front end portion of which communicates with the rear end portions of two coolant-conveying channels 27 which are machined into the adapter 4 and extend forwardly to discharge coolant against the adjacent portions of the knife 2 when the tool is in actual use. The channels 27 of the adapter 4 are inclined with reference to each other (see FIGS. 1 and 2). One of the channels 27 is provided in the leg 4A and the other channel 27 is provided in the leg 4B of the adapter 4.

Prior to assembling the adapter 4 with the front end portion of the shank 3, the plugs 25 are forcibly inserted into the respective bores 23 in the front end face on the stub 10, and the stub 10 is thereupon inserted into the socket 9 between the legs 8 of the adapter 4. This causes the front end portions 28 of the plugs 25 to penetrate into the corresponding bores 24 of the adapter 4, and the tapped bore 13 of the stub 10 registers with the bore 11 in the one leg 8 of the adapter 4. In the next step, the operator inserts the screw 19 so that its threaded shank 20 meshes with the threads in the bore 13. As the screw 19 is being driven home, the edge faces 14 of the rearmost portions of the legs 8 are caused to engage and bear against the internal surfaces 15 of the shoulders 16 on the shank 3. The edge faces 14 are caused to bear against the complementary surfaces 15 as a result of the aforediscussed selection of the diameter of the surface surrounding the outermost portion 12 of the bore 11 and the diameter of the surface 22 surrounding the head 21 of the screw 19. Wedging of the rear portions of the legs 8 against the surfaces 15 of the shoulders 16 ensures that the adapter 4 cannot vibrate relative to the shank 3 when the tool is in actual use. Furthermore, such design of the screw 19 and bore 11 ensures that the adapter 4 is properly centered with reference to the shank 3.

The separation of the adapter 4 from the shank 3 is effected by reversing the sequence of the just enumerated steps. In other words, the screw 19 is removed in a first step, whereupon the adapter 4 can be slipped off the plugs 25 and stub 10 of the shank 3.

If a different material removing knife (such as a milling cutter) is to be attached to the shank 3, the adapter 4 which is shown in FIGS. 1–4 is detached from the shank 3 and is replaced by another adapter which carries the milling cutter. In other words, one and the same shank 3 can accept two or more adapters each of which can carry a different material removing component. The manner in which the milling cutter is attached to its adapter may but need not be the same as the manner in which the knife 2 of FIG. 1 is connected with the illustrated adapter 4. An advantage of the just described mode of utilizing the holder 1 for retention of different types of cutters or knives is that the shank 3 need not even be detached from the torque-transmitting part or parts of a boring or a similar machine when the operator wishes to replace the illustrated knife 2 with a different material removing device, such as a milling cutter, or vice versa. This reduces the time which is necessary to replace a cutter with a different second material removing component or vice versa, and this also reduces the cost of the holder because the major part of the holder remains the same irrespective of the nature of the selected cutter.

Figure 6:
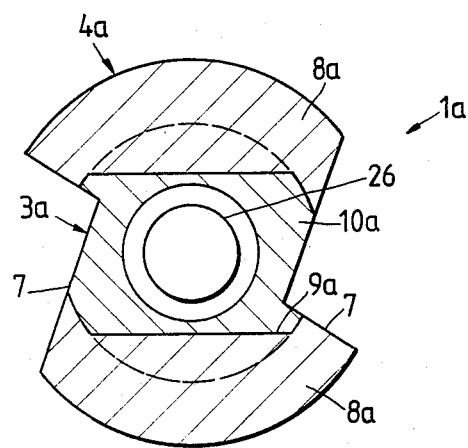
FIG. 6 is a transverse sectional view as seen in the direction of arrows from the line VI—VI of FIG. 5.

Referring now to FIGS. 5 and 6, there is shown a portion of a modified support or holder 1a. All such parts of the holder 1a of FIGS. 5 and 6 which are clearly identical with or analogous to those of the holder 1 shown in FIGS. 1 to 4 are denoted by similar reference characters. Those parts which are modified are denoted by similar reference characters plus the letter a.

The legs 8a of the modified adapter 4a are secured to the stub 10a of the shank 3a by discrete screws 19 each of which is inserted in the same way as described in connection with the similarly referenced screw 19 of FIGS. 1 to 4. Since the connection between the adapter 4a and the shank 3a of FIGS. 5 and 6 comprises two discrete screws 19, the centering plugs 25 of FIGS. 1 to 4 can be dispensed with.

It will be noted that the stub 10a comprises a larger-diameter rear portion and a smaller-diameter front portion which latter is received in the deepest portion of the socket 9a between the legs 8a. The legs 8a are stepped in similar fashion. This is possible because the plugs 25 of FIGS. 1 to 4 are omitted. The construction which is shown in FIGS. 5 and 6 has been found to contribute significantly to the resistance which the legs 8a of the adapter 4a offer to bending or flexing stresses. This, in turn, contributes to greater stability of the cutter or knife which is carried by the adapter 4a.

An important advantage of the improved support or holder is that it can resist pronounced bending stresses. This is due to the fact that the rear edge faces 14 of the legs 8 or 8a are urged against the adjacent surfaces 15 of the respective shoulders 16 when the screw or screws 19 are fully inserted into their respective holes 11 and bores 13. In other words, the screw or screws 19 urge the adapter 4 or 4a axially toward the shank 3 or 3a. This greatly reduces the likelihood of vibration of the adapter 4 or 4a relative to the shank 3 or 3a when the material removing implement is in actual use. The likelihood of bending or flexing of the connection between the adapter and the shank is further reduced due to the fact that the surfaces 15 and the edge faces 14 make acute angles with the axis 6 of the support 1 or 1a, i.e., that the rear end portions of the legs 8 or 8a are wedged in the spaces which are inwardly adjacent to the respective surfaces 15. The shoulders 16 then prevent the rear ends of the legs 8 or 8a from moving away from each other, i.e., away from the axis of the support.

The plugs 25 contribute to more reliable centering of the adapter 4 on the shank 3 and assist the screw 19 of the tool shown in FIGS. 1 to 4 in opposing angular displacements of the adapter relative to the shank 3 or vice versa. As mentioned above, the utilization of a stepped stub 10a and of a similarly stepped socket 9a contributes to a higher resistance against bending of the connection between the adapter 4a and the shank 3a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A material removing tool with a rotary support comprising an adapter arranged to support a cutter or the like and including two spaced-apart legs defining a socket and having edge faces, at least one of said legs having a hole extending substantially radially of said support; a shank including a stub extending into said socket and having a tapped bore extending substantially radially of said support, said shank further having surfaces each adjacent to a different one of said edge faces; and means for releasably securing said adapter to said shank, including a screw having a threaded shank portion threaded into said tapped bore, and a head in said hole, the axes of said hole and said bore being parallel and offset relative to one another so that the head of said screw cooperates with said one leg to urge said edge faces against the respective surfaces of said shank.

2. The tool of claim 1, wherein said shank further comprises a torque receiving portion which is coaxial with said stub.

3. The tool of claim 1, wherein the axis of said bore is nearer to the surfaces of said shank than the axis of said hole.

4. The tool of claim 3, wherein the diameter of said hole exceeds the diameter of said bore.

5. The tool of claim 4, wherein said head has a conical peripheral surface whose diameter increases in a direction away from said bore.

6. The tool of claim 4, wherein said one leg has a conical surface which surrounds said head and whose diameter increases in a direction away from said bore.

7. The tool of claim 1, wherein said shank has two shoulders disposed diametrically opposite each other with reference to the axis of said support and each defining one of said surfaces.

8. The tool of claim 1, wherein said edge faces and said surfaces make acute angles with the axis of said support.

9. The tool of claim 8, wherein said surfaces of said shank are outwardly adjacent to the edge faces of the respective legs.

10. The tool of claim 1, wherein said stub has an end face and at least one bore in said end face, said one bore being parallel to the axis of said support, and said adapter having another bore in register with said one bore; and further comprising a centering plug received in said registering bores.

11. The tool of claim 10, wherein said plug is a press-fit in one of said registering bores and has a rounded or conical end portion received in the other of said registering bores.

12. The tool of claim 1, wherein said securing means comprises a second screw which separably connects the other of said legs with said stub.

13. The tool of claim 1, wherein said socket and said stub are stepped.

14. The tool of claim 13, wherein said socket includes a smaller-diameter inner portion and a larger-diameter outer portion, said stub comprising a smaller-diameter front portion received in the inner portion of said socket and a larger-diameter rear portion received in the outer portion of said socket.

15. The tool of claim 1, wherein said shank has a substantially axially extending coolant-conveying channel, and said adapter has a plurality of coolant-conveying channels each communicating with said axially extending channel and each having an open end arranged to discharge the coolant in the region of the cutter carried by said adapter.

16. The tool of claim 1, wherein the adapter is of one piece and has a first end designed to directly engage the cutter, and a second end designed to directly engage said shank.

17. A material removing tool comprising:
 (a) an adapter member for supporting a material removing implement, said adapter member having an axis of rotation, and a pair of first surfaces which make acute angles with said axis;
 (b) a shank member having a pair of second surfaces each of which is complementary and arranged to be located adjacent to a different one of said first surfaces, one of said members having a pair of spaced legs defining a socket, and each of said legs being provided with one of the surfaces of said one member, at least one of said legs having a hole arranged to extend transversely of said axis, and the other of said members having a stub which is designed to be received in said socket and is provided with a tapped bore arranged to extend transversely of said axis; and
 (c) at least one screw for releasably securing said adapter member to said shank member, said screw having a threaded shank portion designed to be threaded into said bore, and a head receivable in said hole when said threaded shank portion is received in said bore, and the axes of said hole and said bore being offset relative to one another when said members are connected so that said head cooperates with said one leg to urge said first and second surfaces into abutment, said members being designed in such a manner that the surfaces of said other member embrace the surfaces of said one member when said first and second surfaces are in engagement to thereby prevent spreading of said legs.

18. The tool of claim 17, wherein said one member is said adapter member.

* * * * *